US008187102B2

(12) United States Patent
Tsukahara

(10) Patent No.: US 8,187,102 B2
(45) Date of Patent: May 29, 2012

(54) GAMING SYSTEM OBTAINING TIME-OF-DAY DATA FROM A PLURALITY OF TERMINALS AND PROVIDING GAMES MATCHING CUSTOMER PREFERENCES AT RESPECTIVE TIMES-OF-DAY

(75) Inventor: Nakayasu Tsukahara, Koto-ku (JP)

(73) Assignee: Universal Entertainment Corporation, Koto-Ku, Tokyo (JP)

( * ) Notice: Subject to any disclaimer, the term of this patent is extended or adjusted under 35 U.S.C. 154(b) by 450 days.

(21) Appl. No.: 12/472,597

(22) Filed: May 27, 2009

(65) Prior Publication Data

US 2009/0305780 A1 Dec. 10, 2009

Related U.S. Application Data

(60) Provisional application No. 61/059,148, filed on Jun. 5, 2008.

(51) Int. Cl.
*A63F 13/12* (2006.01)

(52) U.S. Cl. .......................................... 463/42; 463/43

(58) Field of Classification Search .......... 463/1, 16–22, 463/25, 30–31, 36–43
See application file for complete search history.

(56) References Cited

U.S. PATENT DOCUMENTS

| | | | | |
|---|---|---|---|---|
| 5,558,339 | A * | 9/1996 | Perlman | 463/42 |
| 6,007,425 | A | 12/1999 | Takemoto et al. | |
| 6,749,510 | B2 * | 6/2004 | Giobbi | 463/42 |
| 7,727,071 | B2 * | 6/2010 | Giobbi | 463/42 |
| 7,753,789 | B2 * | 7/2010 | Walker et al. | 463/42 |
| 7,822,641 | B2 * | 10/2010 | Abbott et al. | 705/25 |
| 2004/0005919 | A1 * | 1/2004 | Walker et al. | 463/23 |
| 2004/0180722 | A1 * | 9/2004 | Giobbi | 463/42 |
| 2006/0252522 | A1 * | 11/2006 | Walker et al. | 463/29 |
| 2007/0155490 | A1 * | 7/2007 | Phillips et al. | 463/29 |
| 2008/0261699 | A1 * | 10/2008 | Topham et al. | 463/42 |
| 2009/0118002 | A1 * | 5/2009 | Lyons et al. | 463/29 |
| 2009/0118022 | A1 * | 5/2009 | Lyons et al. | 463/42 |
| 2009/0181740 | A1 * | 7/2009 | Tsutsui et al. | 463/9 |

* cited by examiner

*Primary Examiner* — Evan Pert

(74) *Attorney, Agent, or Firm* — Lexyoume IP Group, PLLC.

(57) ABSTRACT

A gaming system 10, composed of a server 11 and a plurality of gaming terminals 13, submits selection information including a game type to be executed in a gaming terminal 13 and a picture type, selected by a player in the gaming terminal 13, and operational information indicating operational status to the server 11. The server 11 aggregates the information received from the plurality of gaming terminals 13, and submits the game type and the picture type most selected, as configuration information, to the plurality of gaming terminals 13. In addition, operational information and processing results of the server 11 are displayed on a monitor 16. The gaming terminal 13 changes a stand-by screen in accordance with the configuration information and displays the stand-by screen on liquid crystal displays 30 and 40.

13 Claims, 12 Drawing Sheets

10

(STAND-BY SCREEN DETERMINATION PROCESSING)

SELECTION INFORMATION TABLE

| GAME TERMINAL ID | SELECTION TIME | GAME TYPE | PICTURE TYPE |
|---|---|---|---|
| 1 | 10:00 | SLOT | MOUSE |
| 5 | 11:45 | POKER | GIRL |
| 19 | 12:34 | SLOT | PYROTECHNICIAN |
| 2 | 12:42 | SLOT | PYROTECHNICIAN |
| 6 | 13:13 | POKER | MOUSE |
| 1 | 15:19 | BLACKJACK | PYROTECHNICIAN |
| 7 | 16:28 | SLOT | GIRL |
| ⋮ | ⋮ | ⋮ | ⋮ |

GAMING SYSTEM OBTAINING TIME-OF-DAY DATA FROM A PLURALITY OF TERMINALS AND PROVIDING GAMES MATCHING CUSTOMER PREFERENCES AT RESPECTIVE TIMES-OF-DAY

CROSS REFERENCE TO RELATED APPLICATIONS

This application claims benefit of U.S. Provisional Application No. 61/059,148, filed Jun. 5, 2008, the entire contents of which are incorporated herein by reference.

BACKGROUND OF THE INVENTION

1. Field of the Invention

The present invention relates to a gaming system, more specifically to a gaming system with a plurality of terminals where players can make a selection from a plurality of games or a plurality of images to be displayed on a display, which collects various information regarding the selected games or the selected images and provides a visual display desired by the players for each time of day.

2. Related Art

Information such as a player's behavior and preference is extremely important in game halls having a plurality of terminals to provide games. Generally, game halls provide a plurality of types of games; however, space for installing gaming machines is limited. Therefore, games to be installed in the game hall and the allocation thereof have a great influence on operation of the game hall. A game hall with an unpopular gaming machine may discourage players from visiting.

In addition, especially with video games, operating rates may be different between similar games; for example, those with popular characters displayed may have a higher operating rate than those with banal character displayed.

As described above, installation of game machines in the game hall is directly linked to operation and profit of the game hall, and thus plays an important part in management of the game hall. In order to solve the abovementioned problems, a game hall simulation system, as disclosed in U.S. Pat. No. 6,007,425, is known. With the game hall simulation system, a game hall manager can simulate the operational status of the game hall and traffic route of players. The manager can decide the location of game machines based upon a result thereof, their own experience and the like.

However, in reality, players of different generations and different preferences visit the game hall, depending on the operating hours of the game hall. In such a case, simulating each case with a simulation system to decide which gaming machines to install may take too much time and can not provide a flexible response.

Even with terminals that allow players to select a game, less experienced players tend to choose a gaming machine to play by looking at a display thereof and judging that the gaming machine provides a desired game. Therefore, if a stand-by screen of the gaming machine does not show the player's desired game, the players may misunderstand that the desired game is not provided in the game hall and leave the game hall.

In order to solve the abovementioned problems, the present invention provides a gaming system that allows players to select a game from a plurality of games, storing information regarding games and images selected in each terminal to a server, and provides a display for a game most selected in the same unit time; thus providing an appropriate gaming machine for players at each time of day.

SUMMARY OF THE INVENTION

In a first aspect of the present invention, a gaming system includes: a plurality of terminals for submitting information relating to execution of the game, having a controller for executing a game; memory for storing the information relating to execution of the game; a timer for measuring the amount of time the plurality of terminals are activated; a server for receiving and storing in the memory the information relating to execution of the game from the plurality of terminals; and an output device for outputting result information regarding a processing result of the server or the information relating to execution of the game, in which the server executes processing of: (a) receiving and storing in the memory the information relating to execution of the game that is generated in response to beginning of execution of the game in the plurality of terminals; (b) calculating an operating rate of the plurality of terminals in a predetermined unit time based on the information stored in the memory relating to execution of the game; (c) storing the operating rate for the predetermined unit time in the memory; and (d) submitting an output signal for outputting information relating to the operating rate or the information relating to execution of the game on the output device.

According to a second aspect of the present invention, in the gaming system according to the first aspect, the server further executes processing of: (e) in response to the processing (b), determining whether the operating rate in the unit time is no greater than a predetermined value; and (f) in a case where the operating rate is determined to be no greater than the predetermined value in the processing (e), submitting an output signal for outputting information on the output device notifying that the operating rate is lower than the predetermined value.

According to a third aspect of the present invention, in the gaming system according to the first aspect, the information relating to execution of the game includes information relating to execution time of the game on the terminal having executed the game.

According to a fourth aspect of the present invention, in the gaming system according to the first aspect, the plurality of terminals further includes an input device for accepting a bet from a player; and the information relating to execution of the game includes information relating to the bet accepted by the input device of the terminal having executed the game.

According to a fifth aspect of the present invention, in the gaming system according to the first aspect, the information relating to execution of the game includes information relating to the game in each of the plurality of terminals.

In a sixth aspect of the present invention, a gaming system includes: a plurality of terminals having a controller for submitting information relating to a game and executing the game; a server for receiving the information submitted by each of the plurality of terminals and storing the information in first memory; second memory for storing configuration information relating to a game executed by the plurality of terminals; and a network allowing intercommunication between the terminals and the server, in which the server executes processing of: (a) extracting aggregate information for a unit time including the predetermined period of time, based on the information stored in the first memory once every predetermined period of time; (b) determining the configuration information to be submitted to the plurality of terminals based on the aggregate information; (c) reading the configuration information determined in the processing (b) from the second memory; and (d) submitting the configuration information read in the processing (c) to the plurality of terminals, and in a case where the configuration information is received from the server in the processing (d), the controller of each of the plurality of terminals configures the game based on the configuration information.

According to a seventh aspect of the present invention, in the gaming system according to the sixth aspect, the configuration information includes information relating to image data displayed in the game executed by the plurality of terminals.

According to an eighth aspect of the present invention, in the gaming system disclosed in the sixth aspect, the plurality of terminals includes: a main display for displaying images relating to the game; and a sub display for displaying rendered images, in which the controller displays images corresponding to the game on the main display and the sub display in response to reception of the configuration information.

According to a ninth aspect of the present invention, in the gaming system disclosed in the sixth aspect, the plurality of terminals includes: a selection device for accepting selection regarding the game from a user; and a main display for displaying images relating to the game, in which the controller: before executing the game, displays on the main display information regarding a plurality of games that can be selected and information regarding images that can be displayed during execution of the plurality of games; in a case where selection of a game and selection of an image are accepted via the selection device, submits information regarding the game selected and the image selected as the configuration information to the server, receives a game program of the selected game and the selected image data from the server; displays the image data received on the main display; and makes the game program executable.

According to a tenth aspect of the present invention, in the gaming system disclosed in the sixth aspect, the plurality of terminals includes: a timer for measuring a running time for which the game has been executed; and a credit pool for retaining credit that is reduced after each execution of the game, in which the controller: in a case where the credit retained in the credit pool is no greater than a predetermined value and a determination of the game not to start for a predetermined period of time, submits operation information for a period from a moment of insertion of the credit to a moment of the determination.

In an eleventh aspect of the present invention, a gaming system includes: a plurality of terminals having a selection device for accepting selection of a game program from a plurality of game programs and a controller for submitting selection information received from the selection device and executing a game based on the selection; a server for receiving the selection information submitted by each of the plurality of terminals and storing the selection information to first memory; second memory for storing a plurality of types of the image data to be displayed in the plurality of game programs executed by the plurality of terminals; and a network for allowing intercommunication between the terminals and the server, in which the server executes processing of: (a) extracting aggregate information for a unit time including the predetermined period of time, based on the information stored in the first memory once every predetermined period of time; (b) determining the image data to be submitted to the plurality of terminals based on the aggregate information; (c) reading the image data determined in the processing (b) from the second memory; and (d) submitting the image data read in the processing (c) to the plurality of terminals, in which, in a case where the image data submitted from the server in the processing (d) is received, the controller of each of the plurality of terminals displays the image data on a display.

According to a twelfth aspect of the present invention, in the gaming system according to the eleventh aspect, the controller of each of the plurality of terminals: accepts the game program to execute and a selection of image data to display on the display from the selection device; submits the selection as the selection information to the server, and the server, in the processing (a), extracts the aggregate information, including the selection information regarding the image data.

According to a thirteenth aspect of the present invention, in the gaming system according to the eleventh aspect, the aggregate information extracted in the processing (a) includes information relating the game information and the image data most selected in the unit time.

DETAILED DESCRIPTION OF THE INVENTION

An embodiment of the present invention will be described below with reference to the accompanying drawings.

Figure 1:
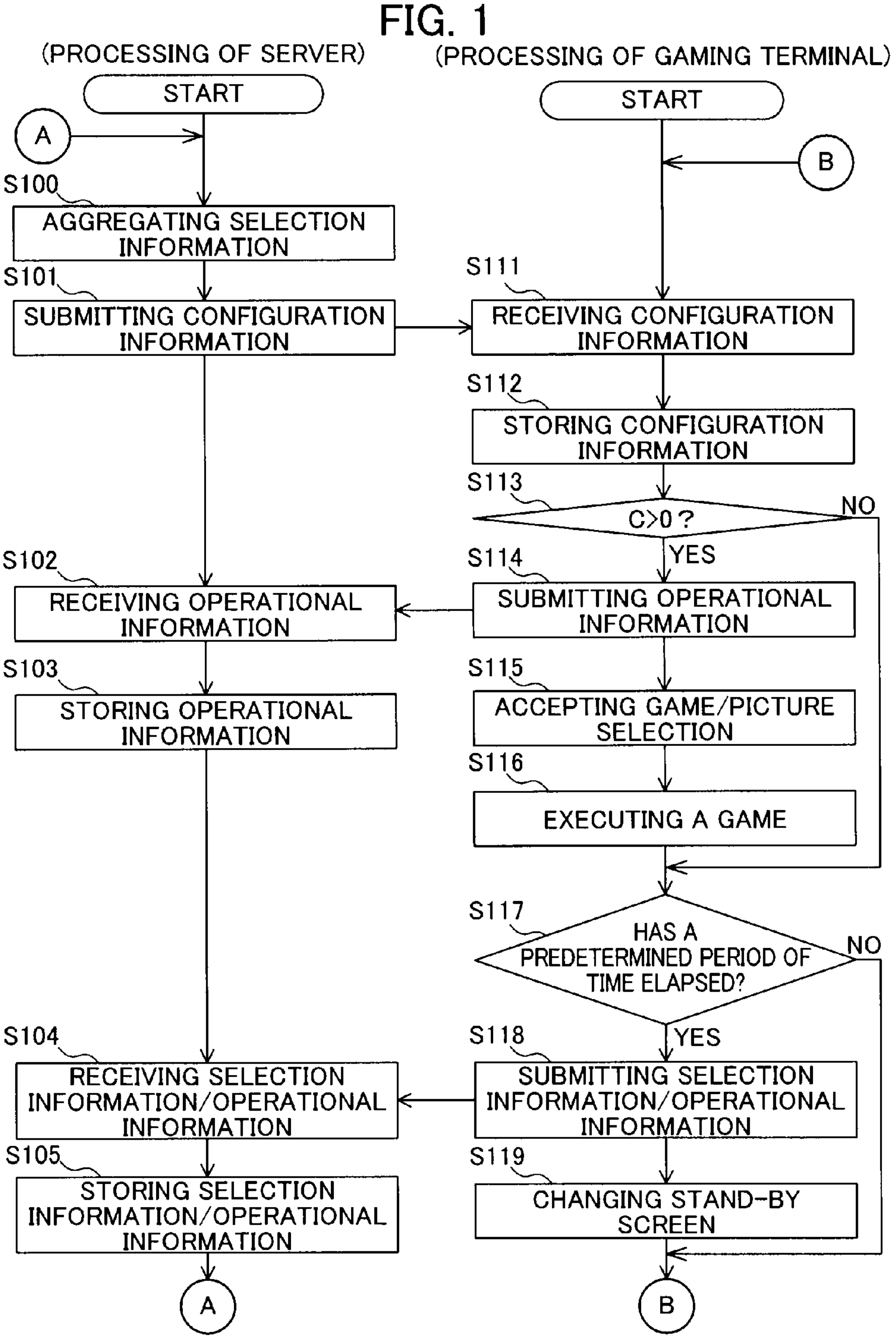
FIG. 1 is a flow chart showing the flow of a game executed in a gaming machine according to an embodiment of the present invention.

As shown in FIG. 1, in a server 11, a CPU 206 (see FIGS. 2 and 3) aggregates selection information (Step S100), and submits configuration information determined as a result thereof (Step S101). Details are described later. In addition, the CPU 206 receives operational information from a gaming terminal 13 (Step S102) and stores the operational information in RAM 210 (see FIG. 3). Furthermore, the CPU 206 of the server 11 receives selection information regarding game type and picture type and operational information from the gaming terminal 13 (Step S104), stores the information as selection information in the RAM 210 (Step S105), and advances to Step S100.

In the gaming terminal 13, a CPU 106 (see FIGS. 2 and 6) receives configuration information from the server 11 (Step S111) and stores the configuration information received in the RAM 110 (see FIG. 6) (Step S112). Then, the CPU 106 of the gaming terminal 13 determines whether the credits are greater than 0 or not (Step S113). In a case where the credits are greater than 0 (in the case of a YES determination), the CPU 106 advances to Step S114. In a case where the credits are 0 (in the case of a NO determination), the CPU 106 advances to Step S117. Subsequently, after accepting selection of a game and of a picture to be displayed in the game by a player (Step S115), the CPU 106 executes the game (Step S116). After executing the game, the CPU 106 of the gaming terminal determines whether a predetermined period of time has elapsed or not (Step S117). In a case where it is determined that the predetermined period of time has elapsed (in the case of a YES determination), the CPU 106 advances to Step S118; in a case where it is determined that the predetermined period of time has not elapsed (in the case of a NO determination), the CPU 106 advances to Step S111. In Step S118, the CPU 106 of the gaming terminal 13 submits information regarding the game and the picture selected to the server 11. In Step S119, the CPU 106 of the gaming terminal 13 switches to a stand-by screen.

Figure 2:
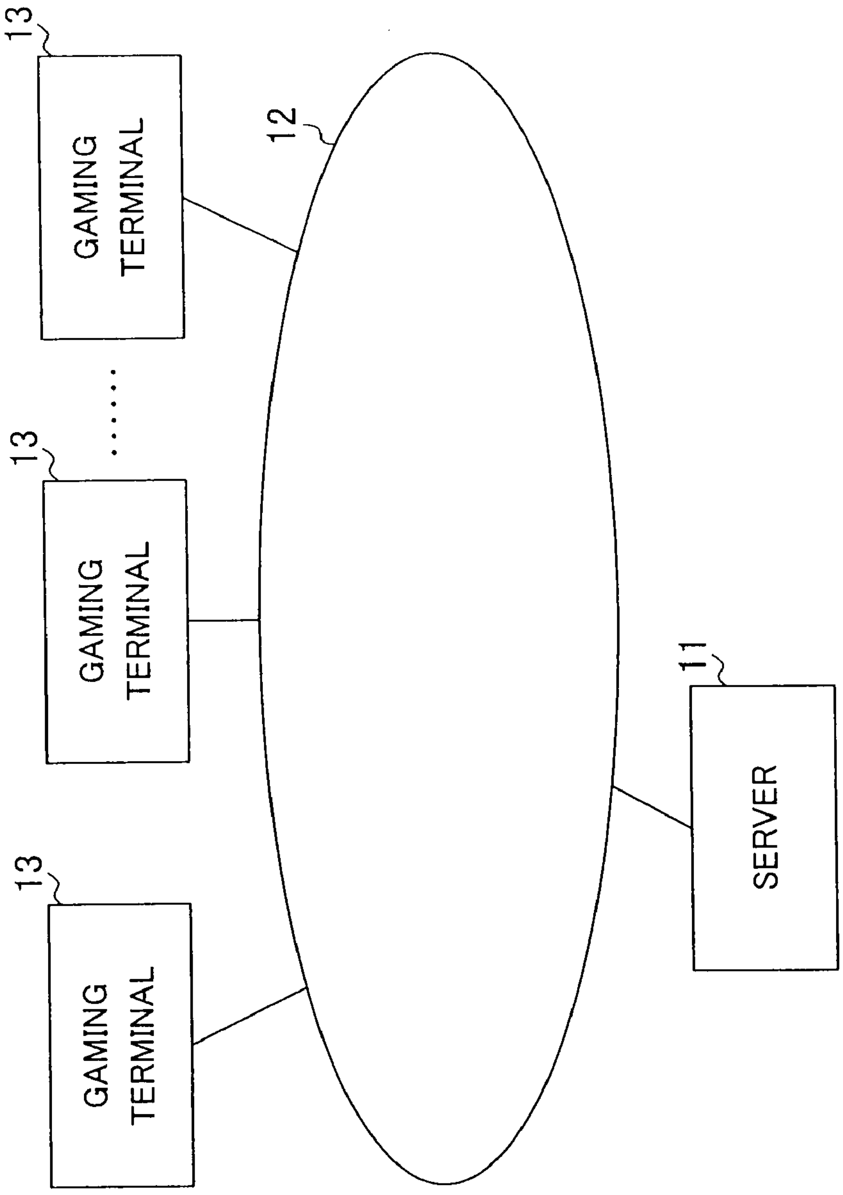
FIG. 2 is a schematic diagram illustrating the gaming system according to an embodiment of the present invention.

The gaming system 10 according to an embodiment of the present invention is hereinafter described. FIG. 2 is a diagram showing a schematic construction of the gaming system 10 according to an embodiment of the present invention. As shown in FIG. 2, the gaming system 10 is mainly composed of a server 11 and a plurality of gaming terminals 13. The server 11 and the plurality of gaming terminals 13 are communicably connected to each other and form a network 12.

The server 11 controls the entire gaming system 10. More specifically, the server 11 can control the plurality of gaming terminals 13 via the network 12.

In the gaming system 10, a player plays a game with the plurality of gaming terminals 13. Each of the plurality of gaming terminals 13 is communicably connected to the server 11 and forms a network 12. In addition, the gaming terminals 13 are, for example, numbered, and the number of the gaming terminal 13 is included in various signals and data submitted to the server 11, thereby allowing the server 11 to identify the gaming terminal 13 having submitted the signal or the data.

The plurality of gaming terminals 13 submits information regarding execution of the game to the server 11. The information related to execution of the game includes information regarding: the game executed in the gaming terminal 13; running time; total bet amount made by a certain player in the gaming terminal 13; bet amount for each game; and the like. The information regarding the game at least includes the type of game selected for a certain gaming terminal and the type of picture to be displayed in each game. In the present embodiment, the type of game can be any video game that can be executed by the gaming terminal 13, such as a slot game, a black jack game, poker game and the like. In addition, the type of picture is a picture to be displayed on liquid crystal displays 30 and 40 (FIGS. 4 and 6) of the gaming terminal 13 during execution of the game. The type of game and the type of picture can be selected from a plurality of options. Details thereof will be described hereinafter.

The configuration of the gaming system 10 according to the present embodiment is described hereinafter.

Figure 3:
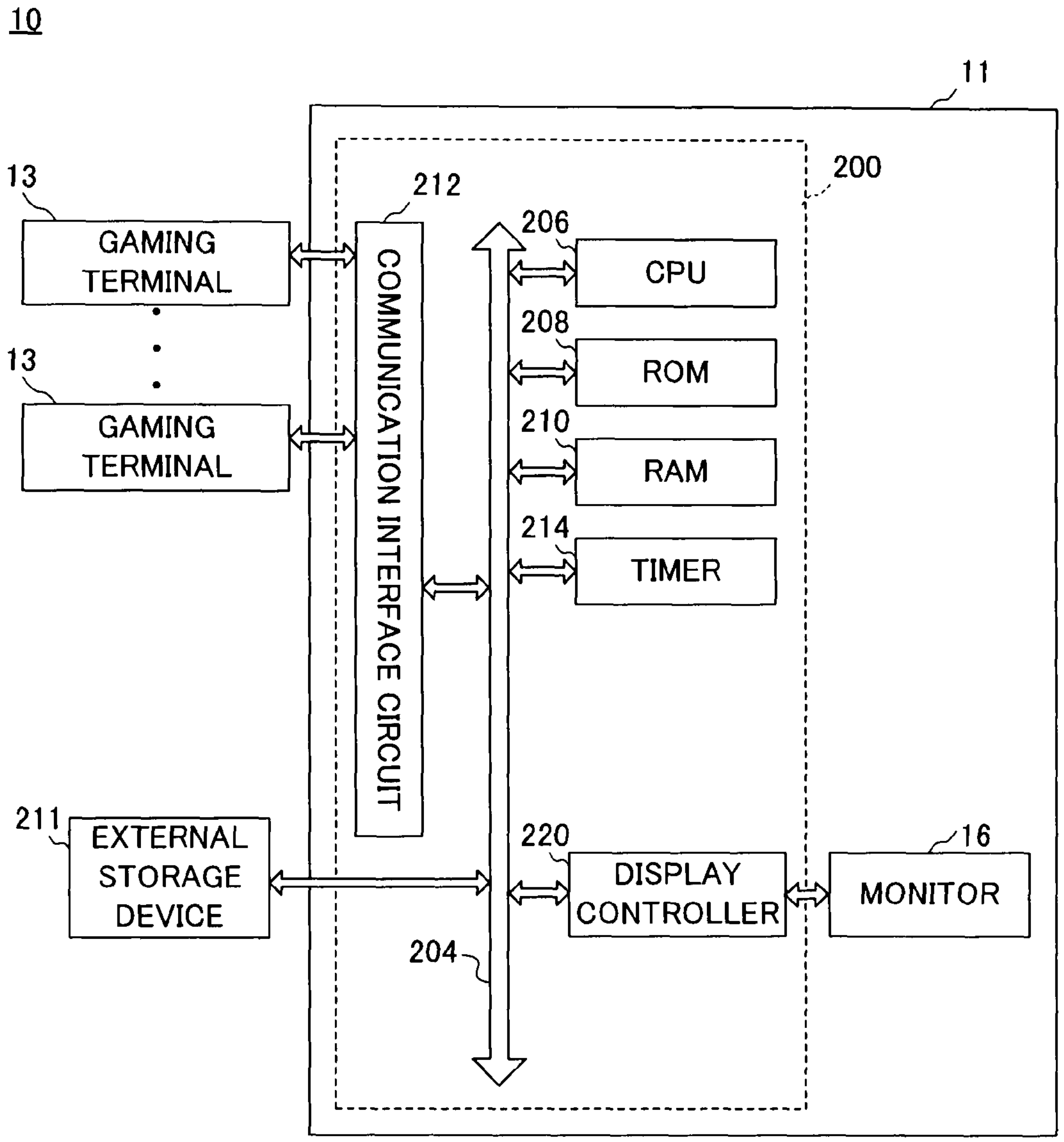
FIG. 3 is a block diagram illustrating the gaming system according to an embodiment of the present invention.

FIG. 3 is a block diagram showing the electrical configuration of the server 11. As shown in FIG. 3, the server 11 is composed of the controller 200 of the server 11 and peripheral devices. In addition, a plurality of gaming terminals 13 is connected thereto via a communication interface circuit 212 of the server 11.

The controller 200 of the server 11 includes an input/output bus 204, a CPU 206, ROM 208, RAM 210, the communication interface circuit 212, a timer 214, and a display controller 220. The ROM 208, the RAM 210, and an external storage device 211 are connected to the input/output bus 204.

The CPU 206 executes various types of processing on the basis of an input signal and the like provided from each gaming terminal 13, and data and programs stored in the ROM 208 and RAM 210. On the basis of a result thereof, the CPU 206 then submits an instruction signal and various types of data to the gaming terminal 13. The CPU 206 thus controls each gaming terminal 13. The CPU 206 then stores selection information provided by each gaming terminal 13 to the RAM 210, and submits configuration information, an instruction signal, and data to each gaming terminal 13 on the basis of an aggregated result obtained by aggregating the selection information. In addition, the CPU 206 aggregates information regarding execution of the game, received from each gaming terminal 13 once every predetermined unit of time, calculates an operating rate and the like, and displays the operating rate and the like on a monitor 16. The monitor 16 is used as an output device of the server 11.

The selection information includes game type information and picture type information regarding the game and the picture selected in each of the plurality of gaming terminals 13. The configuration information is used for selecting a stand-by screen of the gaming terminal 13 and includes type information regarding the game type and the picture type most selected based on the selection information received from the plurality of gaming terminals 13.

The ROM 208 is composed, for example, of semiconductor memory and the like, and stores a program for advancing the game and programs and various tables for controlling each gaming terminal 13. The program can include, for example, programs shown in FIGS. 8, 9, 11, and 12.

On the other hand, the RAM 210 temporarily stores information such as game execution information, selection information, signal data and other information relating to the game submitted from the gaming terminal 13. It should be noted that the game execution information and the selection information can be stored in an external storage device 211 and can be read and used when the configuration information is to be processed.

The external storage device 211 is also connected to the input/output bus 204. The external storage device 211 stores, for example, stand-by screen data and image data of a picture for each game, displayed on the liquid crystal displays 30 and 40 of the gaming terminal 13, and a program for displaying the image data on each gaming terminal 13.

A timer 214 for executing timing is connected to the input/output bus 204. Timing information from the timer 214 is submitted to the CPU 206 via the input/output bus 204, and the CPU 206 makes judgments based thereon regarding input information from the gaming terminal 13 and processing executed by the CPU 206 of the server 11.

The display controller 220 is also connected to the input/output bus 204. The CPU 206 executes various types of processing on the basis of data and programs stored in the ROM 208 and RAM 210. On the basis of a result thereof, the CPU 206 controls a monitor 16, which is a display unit of the server 11, to display an image.

Figure 4:
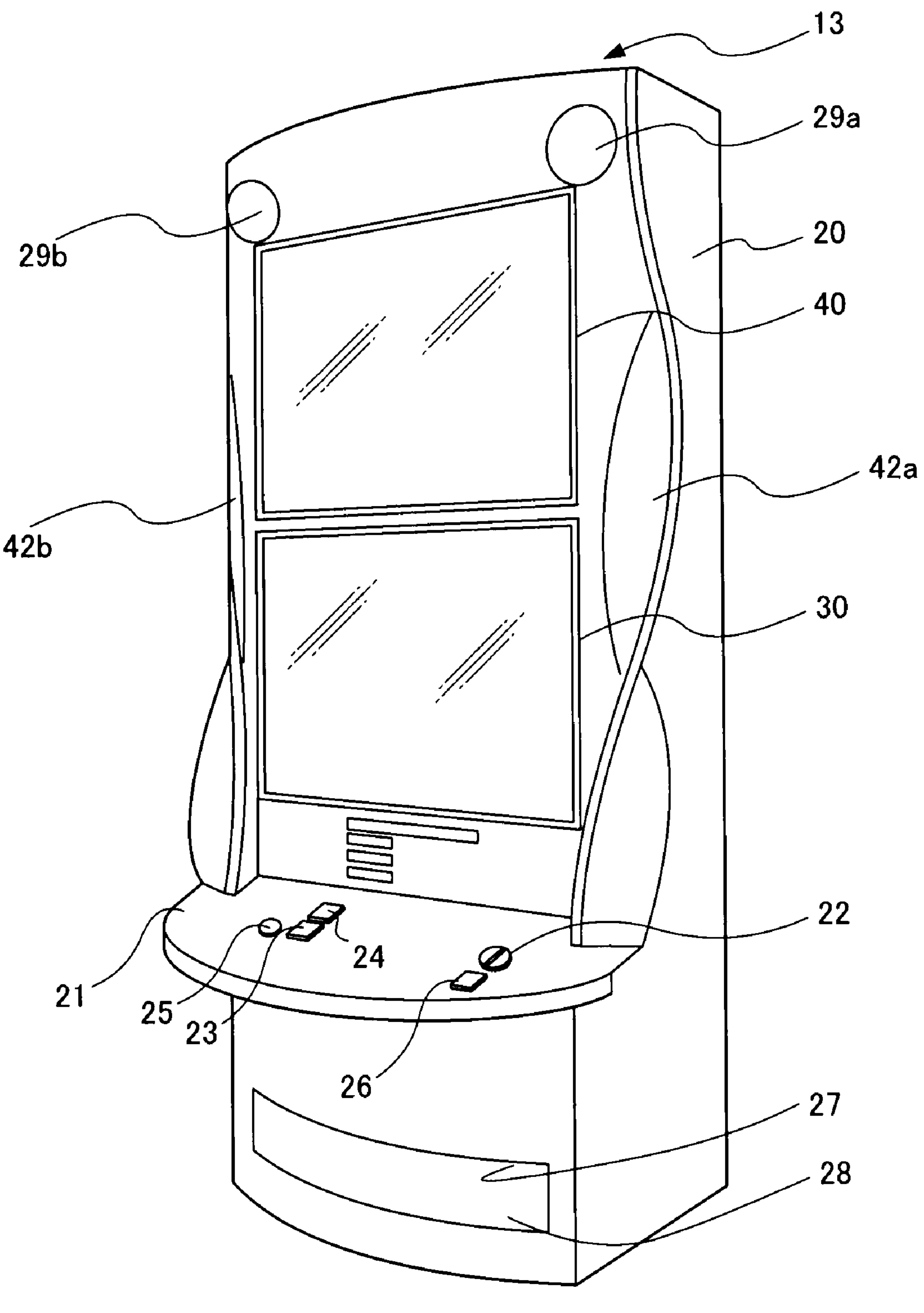
FIG. 4 is a perspective view showing the appearance of the gaming machine according to an embodiment of the present invention.

FIG. 4 is a perspective view illustrating the gaming terminal 13 of the gaming system 10 according to the present embodiment. The gaming terminal 13 includes a cabinet 20. The cabinet 20 has a surface opening toward a player. The cabinet 20 contains various components including a game controller 100 (refer to FIG. 6) for electrically controlling the gaming terminal 13, and a hopper 44 (refer to FIG. 6) for controlling the insertion, storage, and payout of coins as a game medium, and the like. The game medium is not limited to coins, and it may be, for example, medals, tokens, electronic money, or electronic valuable information (credits) equivalent to these.

A liquid crystal display 30 is disposed at substantially the center of the front face of the cabinet 20, and a liquid crystal display 40 is disposed above the display 30.

The liquid crystal displays 30 and 40 are display units for displaying a variety of images related to the game, including rendered images and the like. The player selects a game and a picture for the game by observing the variety of images displayed mainly on the liquid crystal display 30, and then starts playing the game. In a case where there is no player playing the game at the gaming terminal 13, the CPU 106 displays an image for a stand-by screen, demonstration screen, etc. on the liquid crystal displays 30 and 40 (FIG. 5), in accordance with the configuration information received from the server 11.

Figure 5:
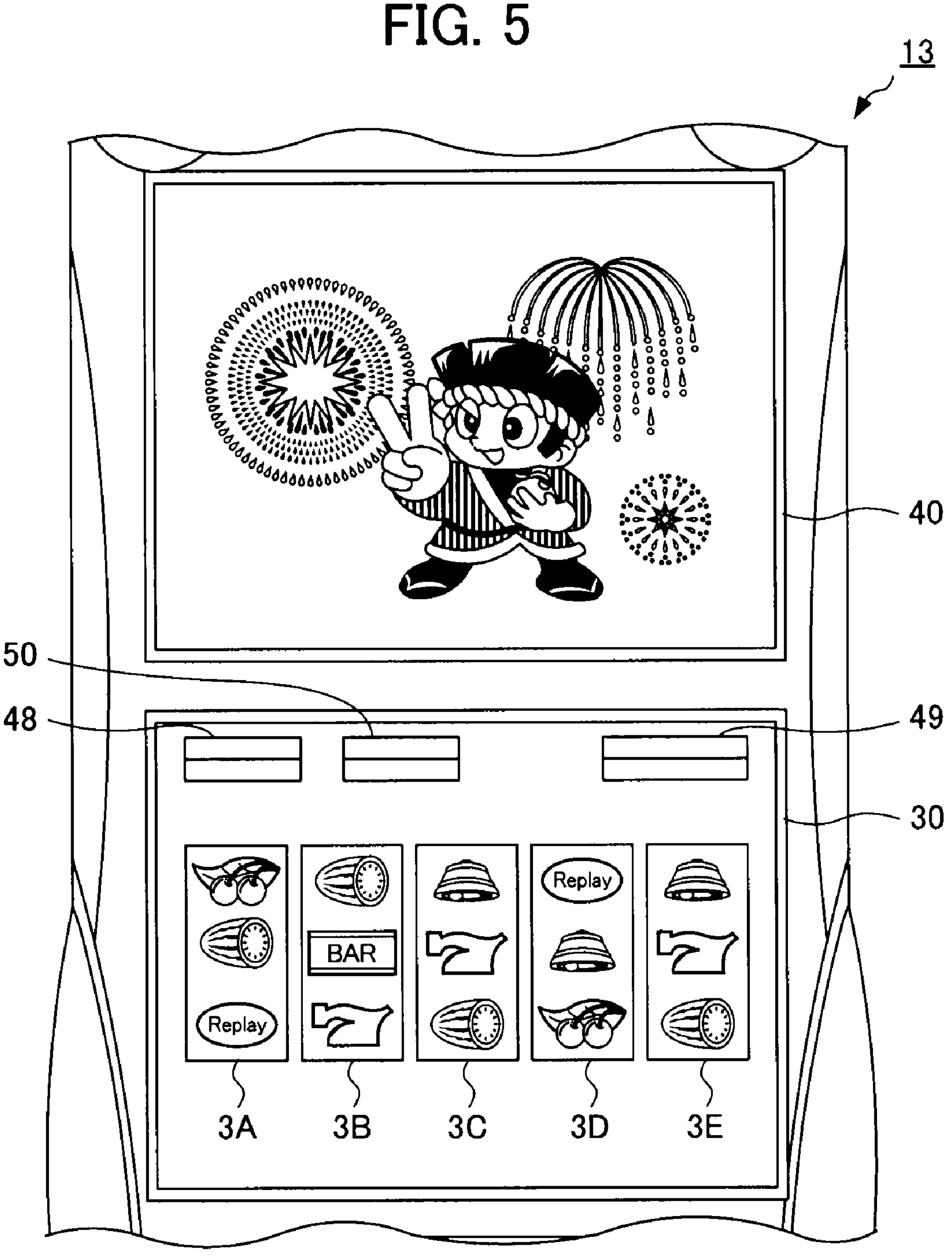
FIG. 5 is an enlarged front view showing a display region of the gaming machine according to an embodiment of the present invention.

As shown in FIG. 5, the gaming terminal 13 includes the liquid crystal displays 30 and 40. The liquid crystal display 30 mainly displays an execution screen of the game, and is used as a main display. The liquid crystal display 30 also displays a selection screen for selecting the game type to be executed in the gaming terminal 13, and a selection screen for selecting a rendered image to be displayed in the selected game type and a picture to be used in the game.

The liquid crystal display 40 is used as a sub display for displaying the rules of the game, a demo mode, and the like. It should be noted that the liquid crystal display 40 displays a stand-by image on the basis of the configuration information submitted from the server 11.

In addition, sound transmission openings 29*a* and 29*b* are provided on both the left and right sides above the liquid crystal display 40, which allow the sound effects generated by a speaker 41 (see FIG. 6) stored within the cabinet 20 to propagate outside the cabinet 20. The sound effects in accordance with the progress of the game or the like can be emitted through the sound permeable openings 29*a* and 29*b*. In addition, decorative lamps 42*a* and 42*b* are provided on both the left and right sides, substantially in the middle of the gaming terminal 13. The decorative lamps 42*a* and 42*b* emit light in accordance with the progress of the game.

A substantially horizontal operation unit 21 is provided below the liquid crystal display 30. Disposed in the vicinity of the right side edge of the operation unit 21 is a coin slot 22 through which coins are inserted into the gaming terminal 13. On the other hand, in the vicinity of the left side edge of the operation unit 21, a bet switch 23 and a spin repeat bet switch 24 are provided for allowing the player to select the number of coins as a game medium to be bet in the game. The spin repeat bet switch 24 allows the player to play the game again without changing the number of coins bet in the previous game. By pushing either the bet switch 23 or the spin repeat bet switch 24, the player can decide the number of coins to be bet in the game and play the game again without any change.

In the operating part 21, a start switch 25 for accepting a starting operation of each game by a player is disposed on the left side of the bet switch 23. A pushing operation on either the start switch 25 or the spin repeat bet switch 24 triggers the start of the game, and an image for starting the game is displayed.

On the other hand, a cash out switch 26 is provided near the coin insertion opening 22 in the aforementioned operation unit 21. When the player presses the cash out switch 26, the inserted coins are discharged from a coin discharge slot 27 opening into a lower part of the front face of the cabinet 20. The discharged coins can be gathered on a coin tray 28.

A payout amount display unit 48, a bet amount display unit 50, and a credit amount display unit 49 are displayed in this order from the left side, on the upper part of the image displayed on the liquid crystal display 30 (see FIG. 5). The payout amount display unit 48 is used for displaying the number of coins to be paid out in a case where the symbols displayed statically are specific symbols qualifying for an award. The credit amount display unit 49 is used for displaying the credit amount of coins stored in the gaming terminal 13. The bet amount display unit 50 is used for displaying the bet amount, i.e. the number of coins bet.

Figure 6:
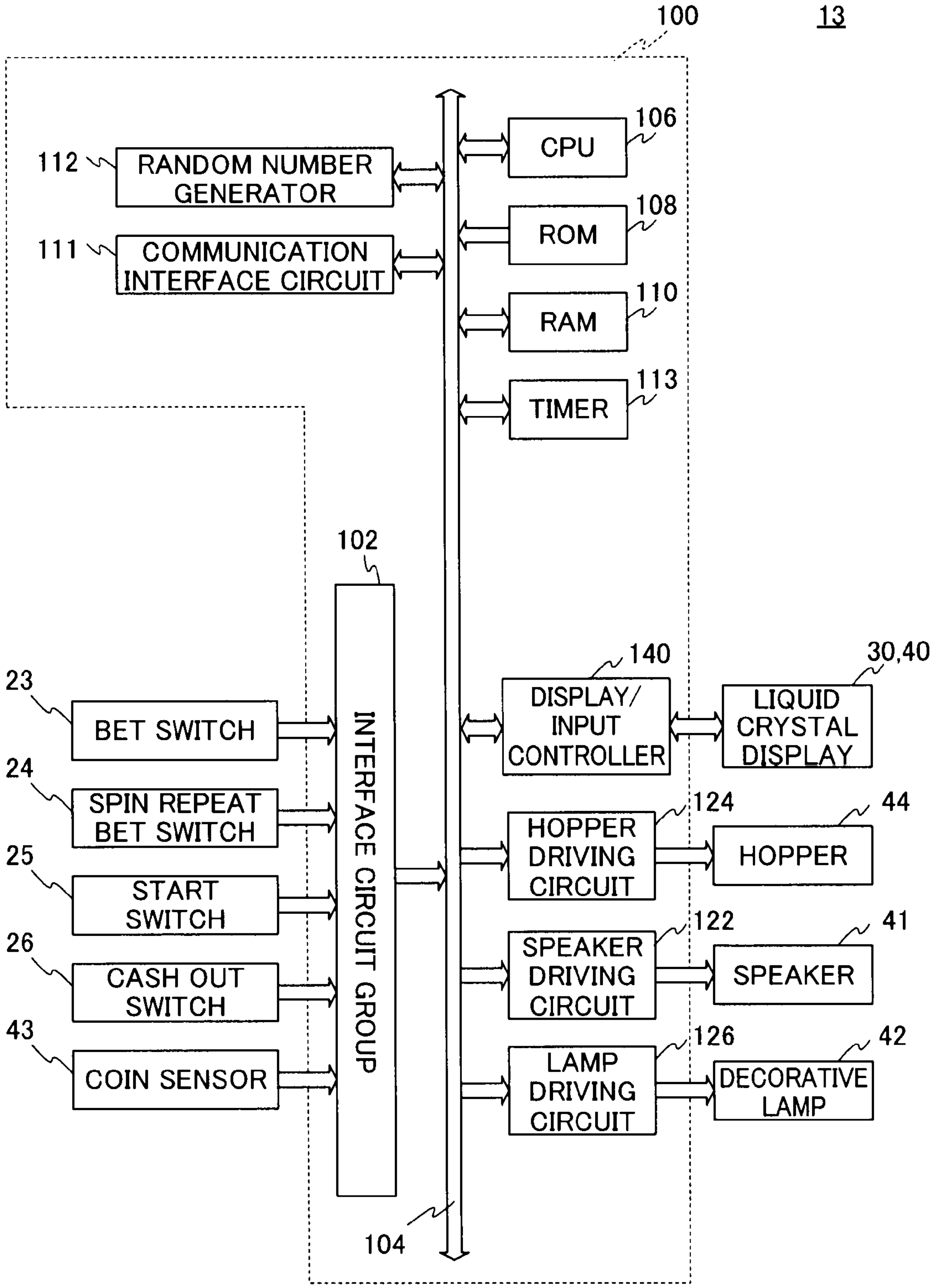
FIG. 6 is a block diagram of a controller of the gaming machine according to an embodiment of the present invention.

FIG. 6 is a block diagram showing the electrical configuration of the game controller 100 of the gaming terminal 13. As shown in FIG. 6, the game controller 100 of the gaming terminal 13 is a microcomputer and is provided with an interface circuit group 102, an input/output bus 104, a CPU 106, ROM 108, RAM 110, a communication interface circuit 111, a random number generator 112, a timer 113, a speaker driving circuit 122, a hopper driving circuit 124, a lamp driving circuit 126, and a display/input controller 140.

The interface circuit group 102 is connected to the input/output bus 104, which inputs and outputs data signals and address signals to a CPU 106.

The start switch 25 is connected to the interface circuit group 102. A start signal output from the start switch 25 is converted into a predetermined signal by the interface circuit group 102 and then supplied to the input/output bus 104.

The bet switch 23, the spin repeat bet switch 24, and the cash out switch 26 are also connected to the interface circuit group 102. Each of the switching signals output from these switches 23, 24, and 26 is also supplied to the interface circuit group 102, converted into a predetermined form of signal by the interface circuit group 102, and then supplied to the input/output bus 104.

A coin sensor 43 is also connected to the interface circuit group 102. The coin sensor 43 is used for detecting coins inserted into the coin slot 22, and is provided in association with the coin slot 22. A sensing signal that is output from the coin sensor 43 is also supplied to the interface circuit group 102, converted into a predetermined signal by the interface circuit group 102, and then supplied to the input/output bus 104.

ROM 108 and RAM 110 are connected to the input/output bus 104. A timer 113 for timing is connected to the input/output bus 204. Timing information from the timer 113 is submitted to the CPU 106 via the input/output bus 204, and the CPU 106 makes judgments based thereon regarding input information from the gaming terminal 13.

Upon acceptance of the start operation of a game from the start switch 25, the CPU 106 reads a game program to execute the game. The game program is programmed so as to display screens relating to the game executed in the gaming terminal 13, on the liquid crystal displays 30 and 40 via the display/input controller 140, on the basis of the configuration information and the image data submitted from the server 11.

Figure 8:
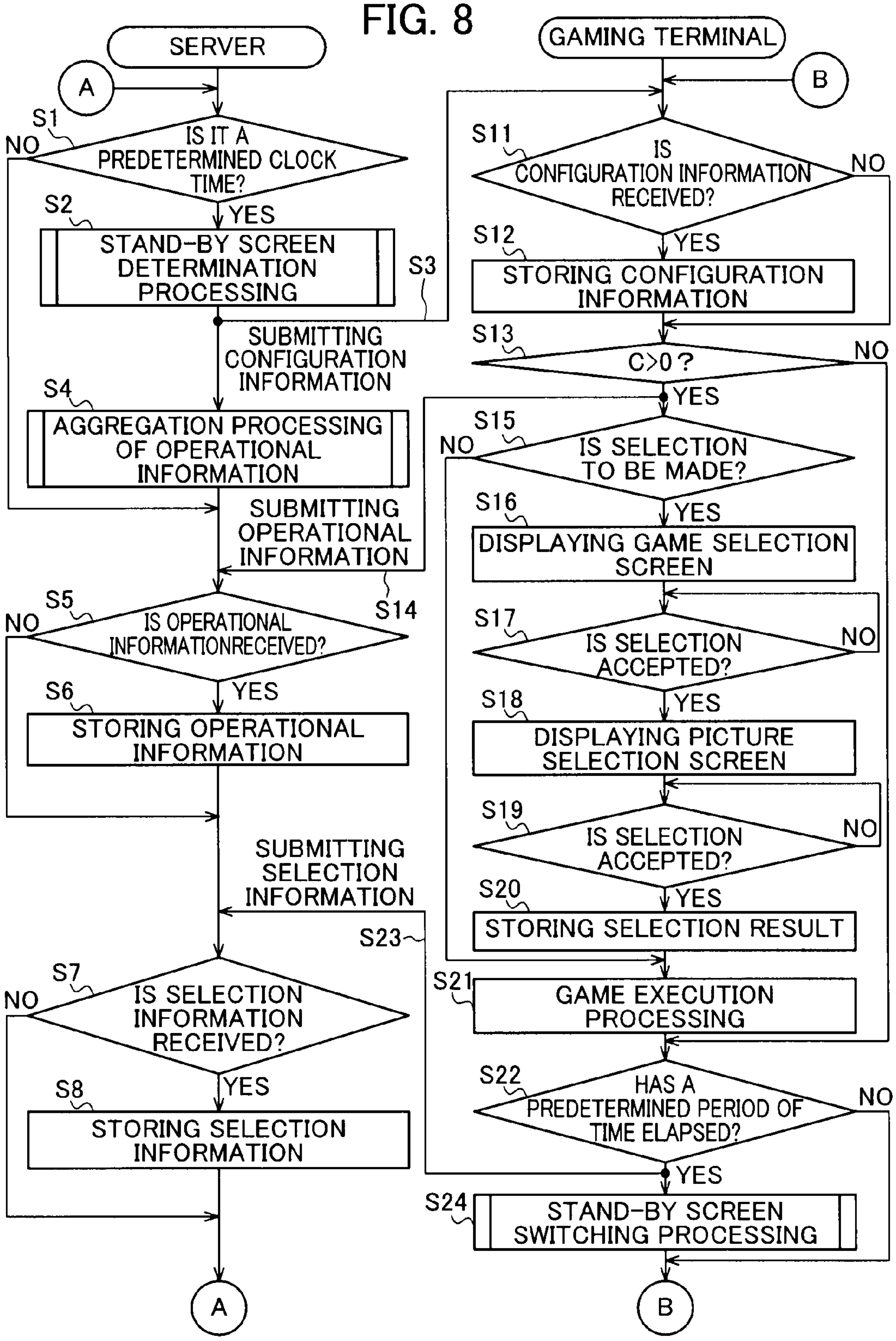
FIG. 8 is a flow chart showing the flow of processing of the gaming system according to an embodiment of the present invention.
Figure 11:
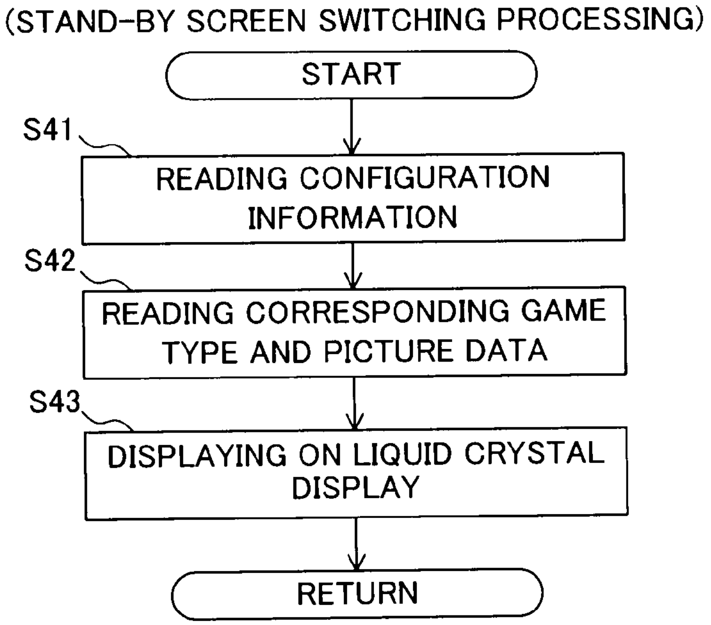
FIG. 11 is a flowchart showing stand-by screen transition processing in a gaming terminal of the gaming system according to an embodiment of the present invention.

The ROM 108 stores a control program for governing and controlling the gaming terminal 13, a program for executing routines as shown in FIG. 8 and FIG. 11 (hereinafter referred to as a "routine execution program"), and initial data for executing the control program, and various data tables used in decision processing. The routine execution program includes the abovementioned game program. The RAM 110 temporarily stores flags, the value of variables, various information received from the gaming terminals 13, and the like used for the abovementioned control program.

Furthermore, a communication interface circuit 111 is connected to the input/output bus 104. The communication interface circuit 111 is a circuit for communication with the server 11 and the like via a network 12 including a variety of LAN networks.

Moreover, the random number generator 112 for generating a random number is connected to the input/output bus 104. The random number generator 112 generates random numbers in a predetermined range of numeric value, for example, 0 to 65535 ($2^{16}-1$). Alternatively, the random numbers may be generated by arithmetic processing of the CPU 106.

A speaker driving circuit 122 for driving a speaker 41 is also connected to the input/output bus 104. The CPU 106 reads sound data stored in the ROM 108, and transmits the sound data to the speaker driving circuit 122 via the input/output bus 104. Thus, predetermined sound effects are output from the speaker 41.

A hopper driving circuit 124 for driving the hopper 44 is also connected to the input/output bus 104. Upon receipt of a cash out signal input from the cash out switch 26, the CPU 106 transmits a driving signal to the hopper driving circuit 124 via the input/output bus 104. This enables the hopper 44 to pay out a number of coins corresponding to the remaining credits at that point, which is stored in a predetermined memory area in the RAM 110.

Alternatively, the payout of the coins may be performed in a mode of storing credit data in a data card or the like, instead of using physical coins. That is to say, with such an arrangement, the player may have his/her own card, which serves as a storage medium. Upon the player inserting this card into the gaming terminal 13, the data relating to the credits is stored in the card.

The lamp driving circuit 126 for driving the decorative lamps 42*a* and 42*b* is also connected to the input-output bus 104. The CPU 106 sends a signal for driving the lamps to the lamp driving circuit 126 under a predetermined condition, based on the program stored in the ROM 108. This causes the decorative lamps 42*a* and 42*b* to blink and the like.

The display/input controller 140 is also connected to the input/output bus 104. The CPU 106 generates an image display instruction in accordance with the game state and the game result, and outputs the generated image display instructions to the display/input controller 140 via the input-output bus 104. Upon receiving the image display instruction from the CPU 106, the display/input controller 140 generates a drive signal for driving the liquid crystal displays 30 and 40 based on the image display instruction thus received, and outputs the generated drive signal to the liquid crystal displays 30 and 40. As a result, a predetermined image is displayed on the liquid crystal displays 30 and 40. In addition, the display/input controller 140 transmits the signal input through the touch panel 32 provided on the liquid crystal displays 30 and 40 to the CPU 106 via the input/output bus 104 in the form of an input signal. It should be noted that the image display instructions include instructions relating to the payout amount display unit 48, the credit amount display unit 49, and the bet amount display unit 50.

Figure 7:
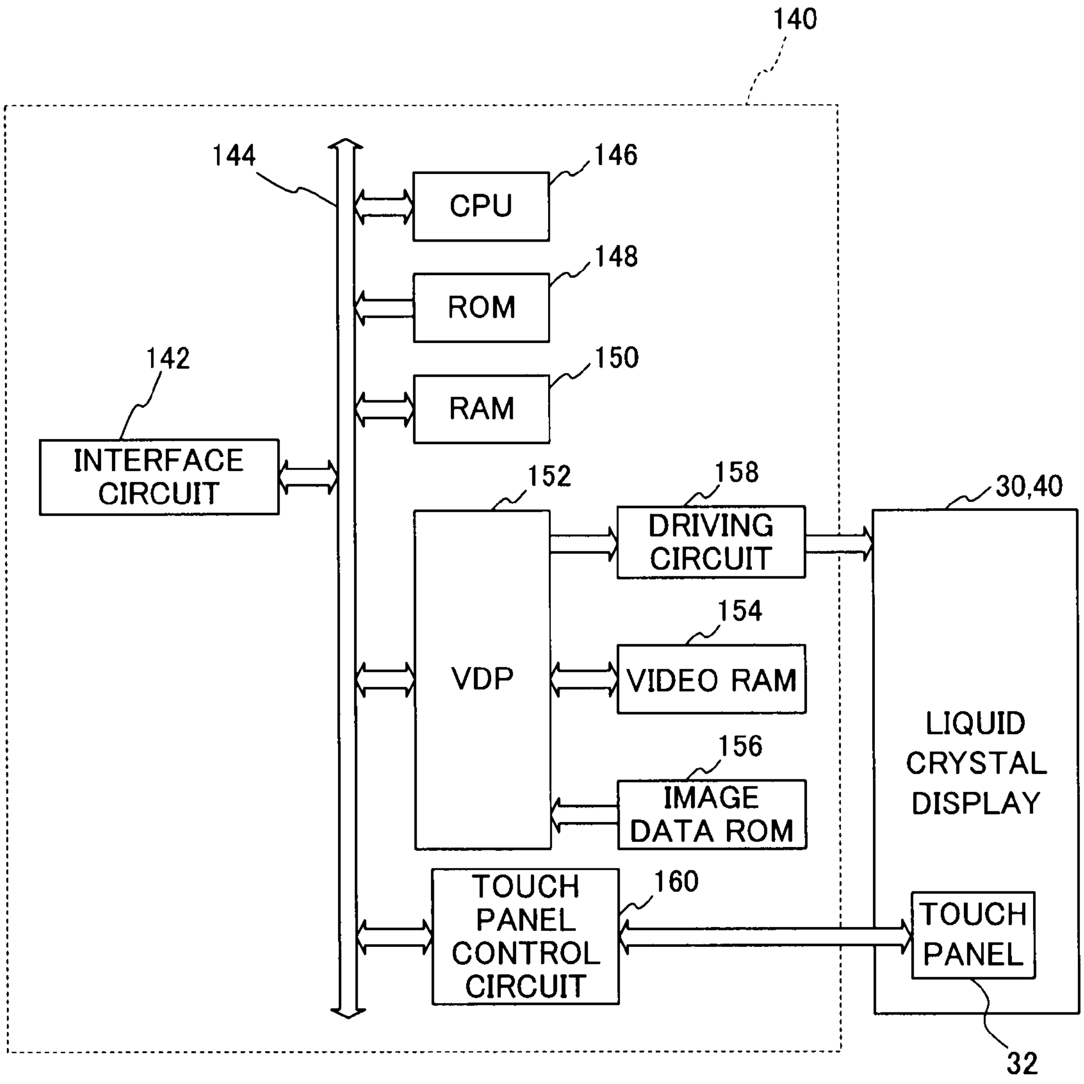
FIG. 7 is a block diagram of a display/input controller of the gaming machine according to an embodiment of the present invention.

FIG. 7 is a block diagram showing the electrical configuration of the display/input controller 140 of the gaming terminal 13. The display/input controller 140 of the gaming terminal 13 is a sub-microcomputer for performing image display processing and input control for the touch panel 32. The display/input controller 140 includes an interface circuit 142, an input/output bus 144, a CPU 146, ROM 148, RAM 150, a VDP 152, video RAM 154, image data ROM 156, a driving circuit 158, and a touch panel control circuit 160.

The interface circuit 142 is connected to the input/output bus 144. An image display command output from the CPU 106 of the aforementioned game controller 100 is supplied to the input/output bus 144 via the interface circuit 142. The input/output bus 144 performs input/output of data signals or address signals to/from the CPU 146.

ROM 148 and RAM 150 are connected to the input/output bus 144. The ROM 148 stores a display control program for generating a driving signal, which is to be supplied to the liquid crystal displays 30 and 40, according to an image display command received from the CPU 106 of the game controller 100. On the other hand, the RAM 150 stores flags and the value of variables used in a display control program.

The VDP 152 is also connected to the input/output bus 144. The VDP 152 is a processing device including a so-called sprite circuit, a screen circuit, a palette circuit and the like, and is capable of performing a variety of processing for displaying an image on the liquid crystal displays 30 and 40. The video RAM 154 and the image data ROM 156 are connected to the VDP 152. The video RAM 154 stores image data based on the image display instructions from the CPU 106 on the game controller 100. The image data ROM 156 stores various types of image data containing rendered image data and the like. Furthermore, the driving circuit 158 for outputting a driving signal that drives the liquid crystal displays 30 and 40 is connected to the VDP 152.

By reading and executing the display control program stored in the ROM 148, a CPU 146 instructs the video RAM 154 to store image data to be displayed on the liquid crystal displays 30 and 40 in response to the image display instructions from the CPU 106 of the game controller 100. The image display instruction includes various types of image display instructions, such as the abovementioned display instruction of rendered image.

The image data ROM 156 stores various types of image data including the rendered image data.

The touch panel control circuit 160 transmits to the CPU 106 the signals input via the touch panel 32, provided on the liquid crystal displays 30 and 40, via the input/output bus 144, in the form of an input signal.

An operational flow of the gaming system 10 will be explained hereinafter with reference to the flow chart shown in FIG. 8. It should be noted that a plurality of gaming terminals 13 are connected to the server 11; however, only one gaming terminal 13 is shown in FIG. 8.

It is supposed that the gaming terminal 13 is activated in advance and the variables used in the CPU 106 on the game controller 100 are initialized to predetermined values, thereby providing a stationary action of the gaming terminal 13.

First, a description is provided regarding the behavior of the server 11.

The CPU 206 of the server 11 first determines whether it is a predetermined time of day or not (Step S1). The predetermined time of day is a clock time defined in advance. The clock time can be defined by a manager of the game hall. For example, the clock time can be defined by every hour, every two hours, once in the morning, once in the afternoon, and once at night. In a case where it is the predetermined time of day (in the case of a YES determination), the CPU 206 advances to Step S2; in a case where it is not the predetermined time of day (in the case of a NO determination), the CPU 206 advances to Step S5.

In Step S2, the CPU 206 executes stand-by screen determination processing, and advances to Step S3. In Step S2, the CPU 206 aggregates various data stored in the RAM 210. The CPU 206 then determines the configuration information to be submitted to the plurality of gaming terminals 13, on the basis of the aggregate information aggregated in Step S2. Details thereof will be described later.

In Step S3, the CPU 206 submits the configuration information determined in the stand-by screen determination processing in Step S2 to the plurality of gaming terminals 13. After this processing, the CPU 206 advances to Step S4. Additionally, a game program corresponding to the selected game type and image data corresponding to the selected picture (in a case where the image data is stored in the RAM 210) can be submitted to each gaming terminal 13 with the configuration information.

In Step S4, the CPU 206 performs aggregation processing. In the aggregation processing, the CPU 106 aggregates information such as operating rate based on various information submitted from each gaming terminal 13. Details thereof will be described later.

In Step S5, the CPU 206 determines whether operational information has been received from the gaming terminal 13 or not. In a case where the operational information has been received (in the case of a YES determination), the CPU 206 advances to Step S6; in a case where the operational information has not been received (in the case of a NO determination), the CPU 206 advances to Step S7.

In Step S6, the CPU 206 stores the operational information received from the gaming terminal 13 to the RAM 210.

In Step S7, the CPU 206 of the server 11 determines whether selection information submitted from the gaming terminal 13 has been received or not. In a case where the selection information has been received (in the case of a YES determination), the CPU 206 advances to Step S8. In a case where the selection information has not been received (in the case of a NO determination), the CPU 206 advances to Step S1.

In Step S8, the CPU 206 of the server 11 stores the received selection information to a predetermined storage region in the RAM 210. After this processing, the CPU 206 advances to Step S1.

The processing of the gaming terminal 13 is described hereinafter.

In Step S11, the CPU 106 of the gaming terminal 13 determines whether the configuration information submitted from the server 11 has been received or not. In a case where the configuration information has been received (in the case of a YES determination), the CPU 106 advances to Step S12. In a case where the configuration information has not been received (in the case of a NO determination), the CPU 106 advances to Step S13.

In Step S12, the CPU 106 of the gaming terminal 13 stores the configuration information received from the server 11. More specifically, the CPU 206 stores the configuration information to a predetermined storage region in the RAM 110. After this processing, the CPU 206 advances to Step S13.

In Step S13, the CPU 106 of the gaming terminal 13 determines whether the credit is greater than 0 or not. In a case where the credit is greater than 0 (in the case of a YES determination), the CPU 106 advances to Step S14; in a case where the credit is not greater than 0 (in the case of a NO determination), the CPU 106 advances to Step S22. More specifically, in the present embodiment, the CPU 106 determines whether information regarding the credit is stored in a predetermined storage region in the RAM 110 or not. In a case where the credit is 0, it is likely that the player will carry out some operations (executes a subsequent game and the like) on the gaming terminal 13. The determination can also be made, for example, during execution of a game. Furthermore, in a case where the information regarding the credit is stored in a predetermined storage region in the RAM 110, the spin repeat bet switch 24 can be operated.

In Step S14, the CPU 106 of the gaming terminal 13 submits operational information, which indicates that the gaming terminal 13 has been activated, to the server 11.

Figure 13:
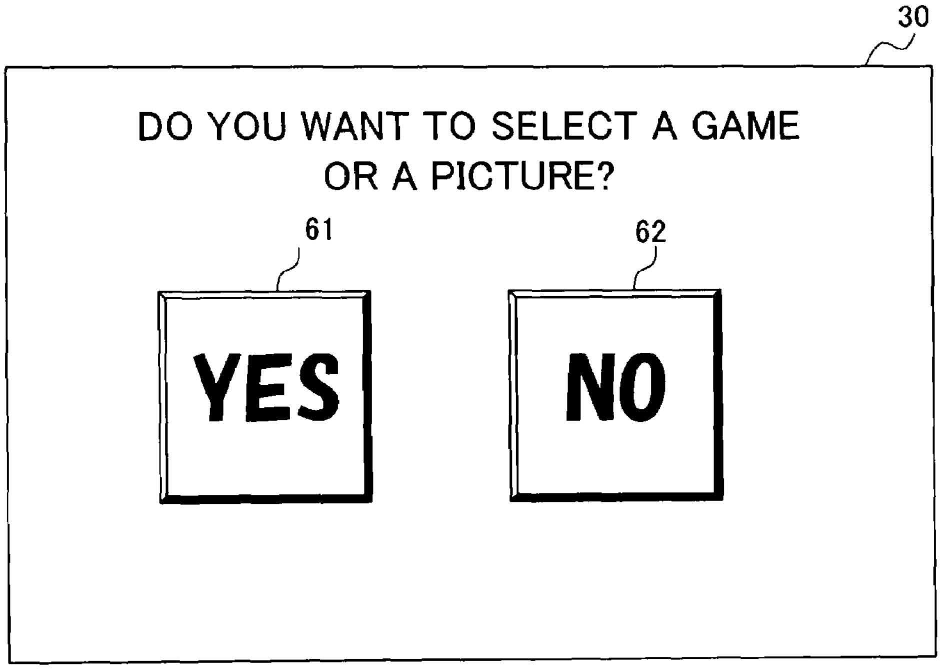
FIG. 13 is a display example of a liquid crystal display of a gaming terminal of the gaming system according to an embodiment of the present invention.

In Step S15, the CPU 106 determines whether selection of game type and picture type will be accepted or not. More specifically, the CPU 106 displays the choice between selecting or not selecting the game type and the picture type on the liquid crystal display 30, and accepts the selection from the player (FIG. 13). In a case where the player's operation for selecting the game type and the picture type is accepted (in the case of a YES determination), the CPU 106 advances to Step S16. Furthermore, in a case where the player's operation for not selecting the game type and the picture type is accepted (in the case of a NO determination), the CPU 106 advances to Step S21.

Figure 14:
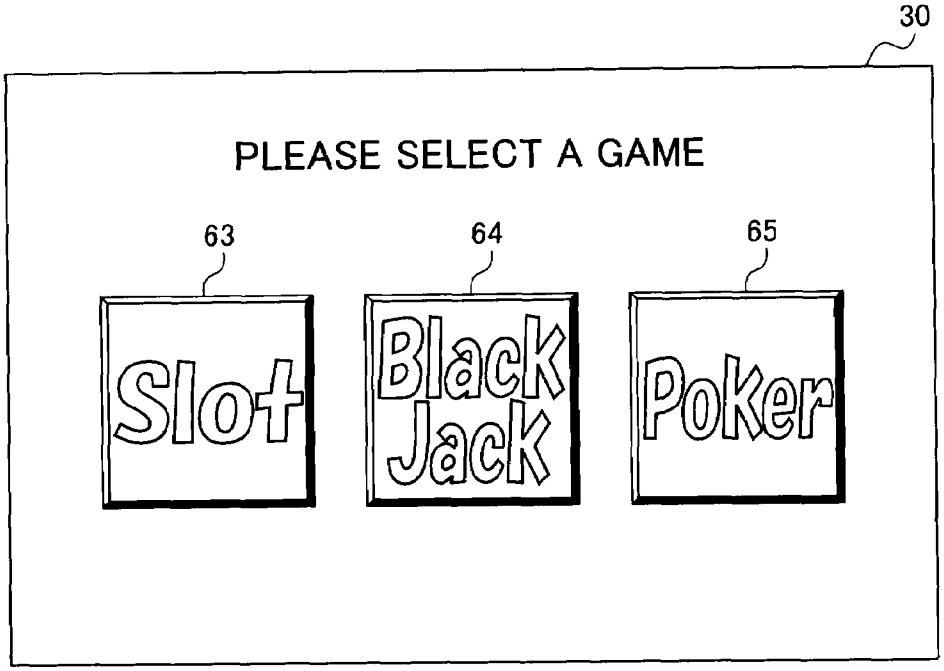
FIG. 14 is a display example of a liquid crystal display of the gaming terminal of the gaming system according to an embodiment of the present invention.

In Step S16, the CPU 106 submits an instruction signal to the display/input controller 140, to display a selection screen for selecting a game type on the liquid crystal display 30 (FIG. 14). This allows the player to select a desired game from options displayed on the liquid crystal display 30. The player's selection is input via a touch panel 32 provided on the surface of the liquid crystal display 30. More specifically, the player touches a region for an option displayed on the liquid crystal display 30, and the input to the region is accepted as an input signal.

In Step S17, the CPU 106 determines whether a selection for a game type is accepted or not. In a case where the selection is accepted (in the case of a YES determination), the CPU 106 advances to Step S18. In a case where the selection is not accepted (in the case of a NO determination), the CPU 106 stands by for the selection.

Figure 15:
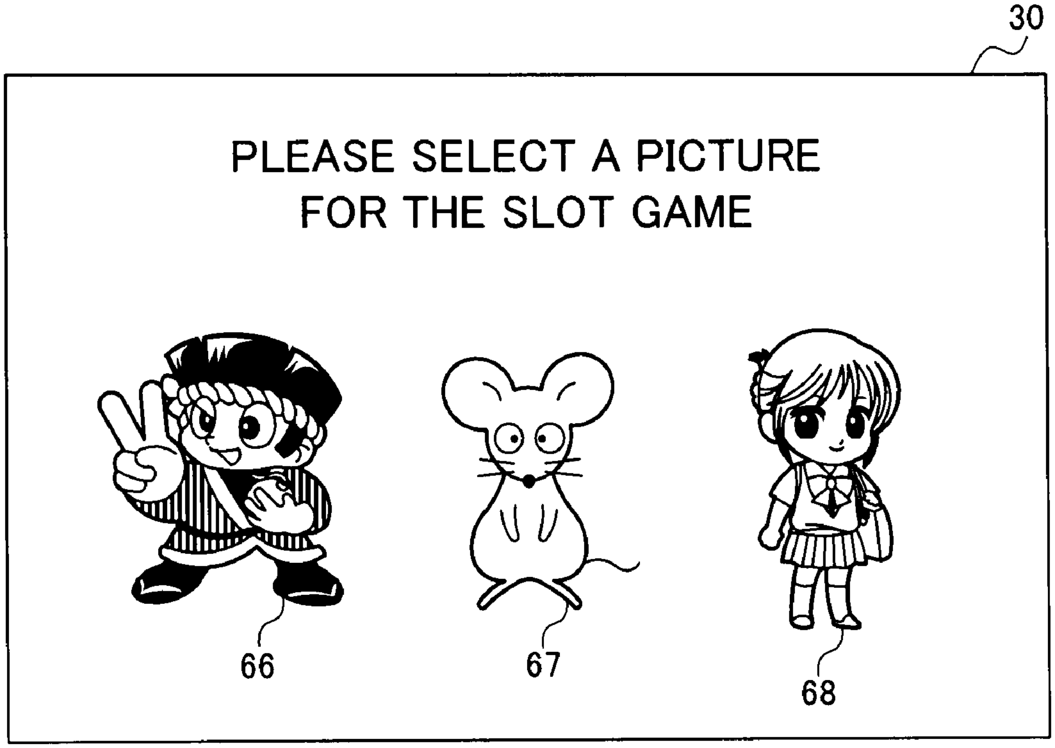
FIG. 15 is a display example of a liquid crystal display of the gaming terminal of the gaming system according to an embodiment of the present invention.

In Step S18, the CPU 106 submits an instruction signal to the display/input controller 140, to display a selection screen for selecting a picture type on the liquid crystal display 30 (FIG. 15). This allows the player to select a picture to be displayed during the selected game, from options displayed on the liquid crystal display 30. The selection is made as described in Step S16; therefore, a description is not repeated.

The "picture to be displayed during the selected game" includes, for example, characters on video reels displayed on the liquid crystal display 30 of a slot game and a picture on playing cards displayed on the liquid crystal display 30 of a blackjack game and a poker game. In addition, images relating to the selected picture are used for: various rendered images displayed on the liquid crystal displays 30 and 40 in accordance with the progress of the game; and a stand-by image displayed when the gaming terminal 13 is in a stand-by status.

In Step S19, the CPU 106 determines whether a selection for a picture type is accepted or not. In a case where the selection is accepted (in the case of a YES determination), the CPU 106 advances to Step S20. In a case where the selection is not accepted (in the case of a NO determination), the CPU 106 stands by for the selection.

In Step S20, the CPU 106 stores the type information regarding the game type and the picture type accepted in Steps S15 to S19 in a predetermined storage region in the RAM 110. The CPU 106 also reads an executable program for executing the game from the ROM 108 based on the type information regarding the selected game and makes the program executable. The CPU 106 also reads image data (e.g., rendered image data) of the corresponding picture from the ROM 108 based on the type information regarding the selected picture and stores the image data in a predetermined storage region in the RAM 110.

In Step S21, the CPU 106 executes a game. After this processing, the CPU 106 advances to Step S22. In Step S22, the CPU 106 determines whether a predetermined period of time has elapsed. The "predetermined period of time" is the time elapsed since the end of the game executed in Step S21. In a case where the predetermined period of time has elapsed (in the case of a YES determination), the CPU 106 advances to Step S23; in a case where the predetermined period of time has not elapsed (in the case of a NO determination), the CPU 106 advances to Step S11.

In Step S23, the CPU 106 submits the type information regarding the game and the picture, stored in the predetermined storage region in the RAM 110 in Step S20, as selection information to the server 11. The CPU 106 also submits various operational information of the gaming terminal 13 along with the selection information, such as: information indicating the end of operation of the gaming terminal 13; bet amount for each game executed; total bet amount for games consecutively executed; execution time; and the like.

In Step S24, the CPU 106 of the gaming terminal 13 executes stand-by screen transition processing. More specifically, the CPU 106 reads the configuration information received from the server 11, stored in the predetermined storage region in the RAM 110 in Step S12. Afterwards, the CPU 106 displays images on the liquid crystal displays 30 and 40, in accordance with the configuration information. This process is further explained hereinafter. After this processing, the CPU 106 advances to Step S11.

Stand-by screen determination processing is described with reference to FIG. 9. The processing is executed by the server 11 to aggregate the selection information submitted from each gaming terminal 13 and, based on the result thereof, to determine the stand-by screen to be displayed on the liquid crystal displays 30 and 40 of the gaming terminals 13.

Figures 9, 10:
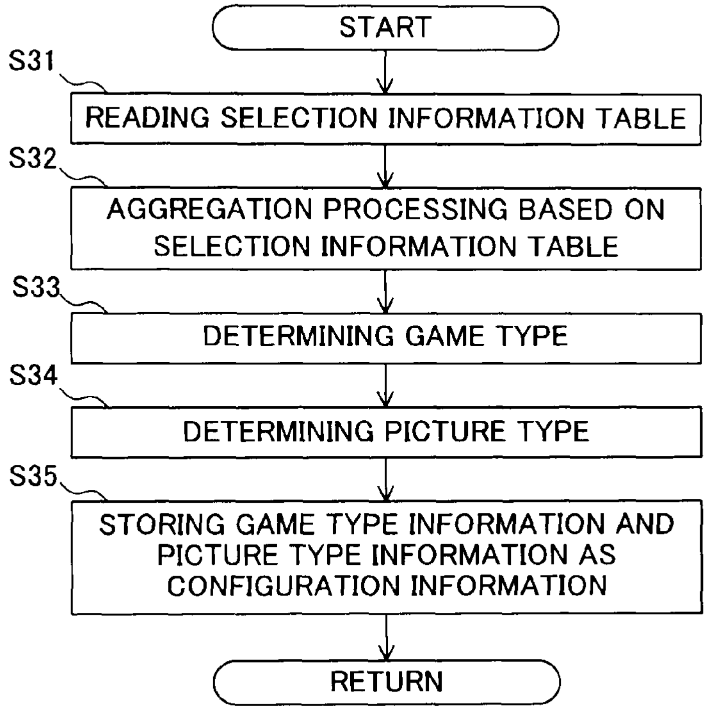
FIG. 9 is a flowchart showing stand-by screen determination processing in a server of the gaming system according to an embodiment of the present invention.
FIG. 10 is a diagram showing a configuration information table of the gaming system according to an embodiment of the present invention.

In Step S31, the CPU 206 of the server 11 reads a selection information table, where the selection information stored in the predetermined storage region in the RAM 210 is stored (FIG. 10).

FIG. 10 shows the selection information table. The selection information table is a storage region for storing the selection information received from the gaming terminals 13. The selection information table stores information such as a gaming terminal ID, selection time, the game type, and the picture type.

The gaming terminal ID is an identification number assigned to each of the gaming terminals 13. The selection time is information regarding the time of day at which the game type was selected (the time of day at which the processing of Step S16 of FIG. 8 was executed). The game type and the picture type are information regarding the selected game type and the selected picture type.

Again in FIG. 9, in Step S32, the CPU 206 executes aggregation processing for the selection information table. More specifically, the CPU 206 counts the number of times each game type and each picture type has been selected, based on the information stored in the selection information table. The CPU 206 can count either for the entire selection information table in the RAM 210, or for a predetermined range of time. For example, the predetermined range of time can be a time unit such as: 1 hour; 3 hours; AM; PM; morning; noon; evening; night; and the like. The time unit can be configured with the server 11 by the manager of the game hall, and the configuration comes into effect in Step S1 of FIG. 8.

In Step S33, the CPU 206 determines which game type information is to be submitted as the configuration information to each gaming terminal 13. In the present embodiment, for example, the game type most selected (with the greatest count value) is determined to be included in the configuration information submitted to the gaming terminals 13, based upon the aggregate information obtained in Step S32.

In Step S34, the CPU 206 determines which picture type information is to be submitted as the configuration information to each gaming terminal 13. In the present embodiment, for example, as in Step S33, the picture type most selected (with the greatest count value) is determined to be included in the configuration information submitted to the gaming terminals 13, based upon the aggregate information obtained in Step S32.

In Step S35, the CPU 206 stores the game type information and the picture type information determined in Steps S33 and S34, as configuration information to be submitted to each gaming terminal 13, to a predetermined storage region in the RAM 210. In addition, a game program corresponding to the selected game type and image data corresponding to the selected picture, stored in an external storage device 211, can be read and stored in the predetermined storage region in the RAM 210, to be submitted to each gaming terminal 13 with the configuration information.

After the processing of Step S35, the CPU 206 terminates the present subroutine and advances to Step S3 of FIG. 8.

A stand-by screen changing processing is described with reference to FIG. 11. The processing is executed by the gaming terminal 13 to change the stand-by screen to be displayed on the liquid crystal displays 30 and 40, based on the configuration information received from the server 11. The stand-by screen is displayed on the gaming terminal 13 not executing a game, until a player begins an operation therewith. The processing is mainly executed by the CPU 106 of the gaming terminal 13.

In Step S41, the CPU 106 reads the configuration information. The CPU 106 reads the configuration information stored in the predetermined storage region in the RAM 110.

In Step S42, the CPU 106 reads a corresponding game program and corresponding image data for a picture, based upon the type information regarding a game and a picture included in the configuration information, and makes the game program and the image data executable. More specifically, the CPU 106 reads the game program of the game type from the ROM 108 and submits an instruction signal to the display/input controller 140 to read the image data of the corresponding picture type. The CPU 146 of the display/input controller 140, after receiving the instruction signal, reads the corresponding image data from image data ROM 156.

In a case where the data regarding the game program and the picture corresponding thereto is also received from the server 11 along with the configuration information, the CPU 106 reads the game program and the image data of the picture stored in the RAM 110 and sends the game program and the image data to the display/input controller 140, along with an instruction signal to display the image data. The image data is submitted to the display/input controller 140 and stored in a predetermined storage region in the RAM 150 when the configuration information is stored in Step S12 of FIG. 8.

In Step S43, the CPU 106 of the gaming terminal 13 displays the stand-by screen corresponding to the game program and the image data of the picture defined in Step S42 on the displays 30 and 40. More specifically, the CPU 106 submits the instruction signal for displaying the stand-by screen on the displays 30 and 40 to the display/input controller 140, and the CPU 146 of the display/input controller 140 then displays the stand-by screen on the liquid crystal displays 30 and 40.

Examples of the stand-by screen include the screen shown in FIG. 5. FIG. 5 shows images displayed on the liquid crystal displays 30 and 40. In addition, FIG. 5 is an example of an image displayed in a case where game type information and picture type information included in the configuration information is "slot game" and "pyrotechnician". Therefore, the liquid crystal display 30 displays reels 3A to 3E for the slot game and the liquid crystal display 40 displays a picture of a pyrotechnician.

This is the combination of the most selected game type and the most selected picture type by the server 11 in the unit time, which is most likely to be selected by players in the game hall. Even in a case where the game type and the picture can be selected, players new to the game hall generally think that the game displayed on the terminal is the only game that can be executed. Therefore, by displaying the game and the picture that are highly likely to be selected, the gaming terminal 13 can proactively attract players. Moreover, as the configuration can be changed at predetermined times of day, the display can be switched, in accordance with the preference of players visiting the game hall, based upon the aggregate information for each time of day.

Figure 12:
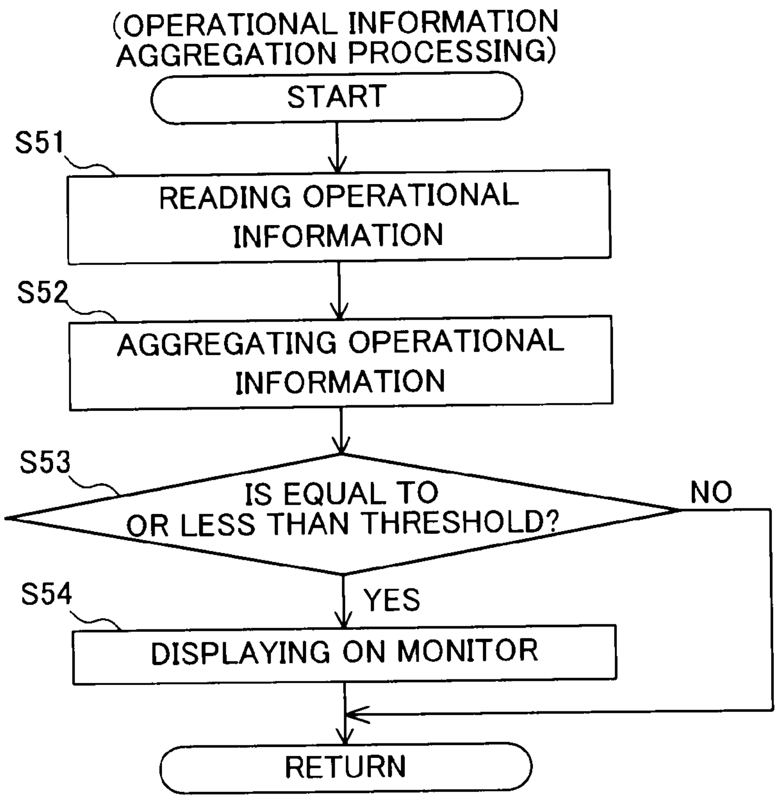
FIG. 12 is a flowchart showing operational information aggregation processing in a server of the gaming system according to an embodiment of the present invention.

Aggregation processing is described hereinafter with reference to FIG. 12. The aggregation processing, a subroutine shown in Step S4 of FIG. 8, is executed by the server 11.

First, in Step S51, the CPU 206 of the server 11 reads the operational information stored in the RAM 210. In Step S52, the CPU 206 calculates the operating rate based upon the operational information. More specifically, the CPU 206 calculates the operating rate of all the gaming terminals 13 based upon the operational information, stored in the RAM 210, indicating that the gaming terminal 13 has started its operation. After this processing, the CPU 206 advances to Step S53.

In Step S53, the CPU 206 determines whether the operating rate calculated in Step S52 is equal to or lower than a predetermined threshold or not. In a case where the operating rate is greater than the predetermined threshold (in the case of a NO determination), the CPU 206 terminates the present subroutine and advances to Step S5 of FIG. 8. In a case where the operating rate is no greater than the predetermined threshold (in the case of a YES determination), the CPU 206 advances to Step S54.

In Step S54, the CPU 206 displays information, indicating that the operating rate is no greater than the threshold, on the monitor 16. The information preferably warns the manager about the operating rate being no greater than the threshold. For example, the operating rate can be shown along with the threshold or with the change of past operating rate. In addition, information can also be displayed along with the operating rate regarding: active/inactive gaming terminals 13 in the game hall; game execution time on each gaming terminal 13; bet amount for each game; total bet amount for consecutively executed games by a player; and the like. As with the operating rate, the change in the past, aggregated information for the entire game hall, and aggregated information for each gaming terminal 13 can also be displayed on the monitor 16, along with the abovementioned information.

The manager can comprehensively recognize the behavior of players in the game hall; for example, how the players have executed the games. The manager can select games and prizes, which are more favorable, based on the above-mentioned information. The information for deciding a management strategy of the game hall can thus be provided to the manager.

A display example of the liquid crystal display 30 of the gaming terminal 13 is described hereinafter with reference to FIGS. 13 to 15.

FIG. 13 is a screen displayed in Step S15 of FIG. 8. The screen is displayed for accepting the choice between selecting or not selecting the game type and the picture type, from the player. A YES button 61 and a NO button 62 are displayed on the liquid crystal display 30 to allow the player to make a selection. The player can make a selection by touching a region where the YES button 61 or the NO button 62 is displayed.

FIG. 14 is a screen displayed in Step S16 of FIG. 8. The screen is displayed for accepting the choice from the player, regarding the game type. A SLOT button 63, a BLACKJACK button 64, and a POKER button 65 are displayed on the liquid crystal display 30 to allow the player to make a selection. The SLOT button 63 is associated with a slot game, the BLACKJACK button 64 is associated with a blackjack game, and a POKER button 65 is associated with a poker game. The player can select a game by these buttons. The player can make a selection by touching a region where each button is displayed.

FIG. 15 is a screen displayed in Step S18 of FIG. 8. The screen is displayed for accepting the choice from the player, regarding the picture type. A PYROTECHNICIAN button 66, a MOUSE button 66, and a GIRL button 68 are displayed on the liquid crystal display 30 to allow the player to make a selection. By selecting any one of the buttons, various rendered images and pictures displayed in the game program to be executed can be changed to PYROTECHNICIAN, MOUSE, or GIRL. The player can make a selection by touching a region where each button is displayed.

While the embodiment and modifications of the gaming system according to the present invention have been described, it is to be understood that the above description is intended to be illustrative, and not restrictive, and any changes in design may be made to specific configurations such as various means. Additions, omissions, substitutions, and other modifications can be made thereto without departing from the spirit or scope of the present invention.

In the abovementioned embodiment, the server 11 submits the configuration information to each of the plurality of gaming terminals 13, and each gaming terminal 13 changes the stand-by screen based upon the configuration information received; however, the present invention is not limited thereto. For example, the server 11 can submit the configuration information to only a predetermined number of gaming terminals 13. Furthermore, a predetermined number of gaming terminals 13 can keep the stand-by screen unchanged. This can provide a predetermined number of gaming terminals 13 that do not change the stand-by screen, thus preventing the stand-by screen from changing in all the gaming terminals 13. With the stand-by screen changing in all the gaming terminals 13, players may think that the game type and the picture type are uniform for all the gaming terminals 13. The abovementioned configuration can address this problem.

This can convince the players that gaming terminals 13 with various game types and various picture types are provided in the game hall. Moreover, by displaying the most popular (the most selected) game and picture as the stand-by screen, the player may think that preferred games are provided.

What is claimed is:

1. A gaming system comprising:

a plurality of terminals, including a controller configured to execute a game, configured to receive and submit information relating to execution of the game, the information including a plurality of images that can be displayed during execution of the game;

memory configured to store the information relating to execution of the game;

a timer configured to measure a time the plurality of terminals are activated;

a server configured to receive and store in the memory the information relating to execution of the game from the plurality of terminals; and an output device configured to output result information regarding a processing result of the server or the information relating to execution of the game, wherein the server (a) receives and stores in the memory the information relating to execution of the game that is generated in response to beginning of execution of the game in the plurality of terminals;

(b) calculates an operating rate of the plurality of terminals in a predetermined unit time, based on the information relating to execution of the game stored in the memory;

(c) stores the operating rate for the predetermined unit time in the memory; and (d) submits an output signal to output information relating to the operating rate or the information relating to execution of the game on the output device, wherein the controller of each of the plurality of terminals displays an image of the plurality of images based on the operating rate.

2. The gaming system according to claim 1, wherein the server (e) determines, in response to the processing (b), whether the operating rate in the unit time is no greater than a predetermined value; and (f) in a case where the operating rate is determined not to be greater than the predetermined value, submits an output signal to output information on the output device notifying that the operating rate is not greater than the predetermined value.

3. The gaming system according to claim 1, wherein the information relating to execution of the game includes information relating to execution time of the game on the terminal having executed the game.

4. The gaming system according to claim 1, wherein the plurality of terminals further comprise:

an input device for accepting a bet from a player, wherein the information relating to execution of the game includes information relating to the bet accepted by the input device of the terminal having executed the game.

5. The gaming system according to claim 1, wherein the information relating to execution of the game includes information relating to the game in each of the plurality of terminals.

6. A gaming system comprising:

a plurality of terminals including a controller configured to receive and submit information relating to a game and to execute the game, the information including a plurality of images that can be displayed during execution of the game;

a server configured to receive the information submitted by each of the plurality of terminals and store the information in first memory;

second memory configured to store configuration information relating to a game executed by the plurality of terminals; and a network configured to provide intercommunication between the terminals and the server, wherein the server (a) extracts aggregate information for a unit time including the predetermined period of time, based on the information stored in the first memory, once every predetermined period of time;

(b) determines the configuration information to be submitted to the plurality of terminals based on the aggregate information;

(c) reads the configuration information determined in the processing (b) from the second memory; and (d) submits the configuration information read in the processing (c) to the plurality of terminals, and wherein, in a case where the configuration information is received from the server in the processing (d), the controller of each of the plurality of terminals displays an image of the plurality of images and configures the game based on the configuration information.

7. The gaming system according to claim 6, wherein the configuration information includes information relating to image data displayed in the game executed by the plurality of terminals.

8. The gaming system according to claim 6, wherein the plurality of terminals further include a main display configured to display images relating to the game; and a sub display configured to display rendered images, wherein the controller displays images corresponding to the game on the main display and the sub display in response to reception of the configuration information.

9. The gaming system according to claim 6, wherein the plurality of terminals further includes a selection device configured to accept a selection related to the game from a user; and a main display configured to display images related to the game, wherein the controller displays, on the main display and before executing the game, information regarding a plurality of games that can be selected and the plurality of images that can be displayed during execution of the plurality of games, and in a case where game selection and image selection are accepted via the selection device, submits information regarding the game selected and the image selected as the configuration information to the server, receives a game program of the selected game and selected image data from the server;

displays the received image data on the main display; and makes the game program executable.

10. The gaming system according to claim 6, wherein the plurality of terminals include a timer configured to measure a run time for which the game has been executed; and a credit pool configured to retain credits that are reduced after each execution of the game, and wherein, in a case where the credits retained in the credit pool are not greater than a predetermined value and a determination is performed for the game not to start for a predetermined period of time, the controller submits operation information for a period from a moment of insertion of the credit to a moment of the determination.

11. A gaming system comprising:

a plurality of terminals including a selection device configured to accept selection of a game program from a plurality of game programs, and a controller configured to submit selection information received from the selection device and execute a game based on the selection, the information including a plurality of images that can be displayed during execution of the game;

a server configured to receive the selection information submitted by way of each of the plurality of terminals and storing the selection information in first memory;

second memory configured to store a plurality of types of image data to be displayed in the plurality of game programs executed by the plurality of terminals; and a network configured to provide intercommunication between the terminals and the server, wherein the server (a) extracts aggregate information for a unit time including the predetermined period of time, based on the information stored in the first memory once every predetermined period of time;

(b) determines the image data to be submitted to the plurality of terminals based on the aggregate information;

(c) reads the image data determined in the processing (b) from the second memory; and (d) submits the image data read in the processing (c) to the plurality of terminals, wherein, in a case where the image data submitted from the server in the processing (d) is received, the controller of each of the plurality of terminals displays the image data on a display.

12. The gaming system according to claim 11, wherein the controller of each of the plurality of terminals accepts the game program to execute and selection of image data to display on the display from the selection device and submits the selection as the selection information to the server, and the server extracts the aggregate information, including the selection information regarding the image data, in the processing (a).

13. The gaming system according to claim 11, wherein the aggregate information extracted in the processing (a) further includes information relating the game information and the image data most selected in the unit time.

* * * * *